(12) United States Patent
Aihara et al.

(10) Patent No.: US 11,390,534 B2
(45) Date of Patent: Jul. 19, 2022

(54) TUNGSTEN TRIOXIDE

(71) Applicant: SUMITOMO METAL MINING CO., LTD., Tokyo (JP)

(72) Inventors: Toshiaki Aihara, Ehime (JP); Hiroyuki Toya, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 221 days.

(21) Appl. No.: 16/765,287

(22) PCT Filed: Nov. 21, 2018

(86) PCT No.: PCT/JP2018/042991
§ 371 (c)(1),
(2) Date: May 19, 2020

(87) PCT Pub. No.: WO2019/103040
PCT Pub. Date: May 31, 2019

(65) Prior Publication Data
US 2020/0308018 A1    Oct. 1, 2020

(30) Foreign Application Priority Data
Nov. 21, 2017 (JP) .............................. JP2017-224024

(51) Int. Cl.
*C01G 41/02* (2006.01)

(52) U.S. Cl.
CPC .......... *C01G 41/02* (2013.01); *C01P 2002/74* (2013.01); *C01P 2004/61* (2013.01); *C01P 2006/12* (2013.01)

(58) Field of Classification Search
CPC .................................................. C01G 41/02
See application file for complete search history.

(56) References Cited

U.S. PATENT DOCUMENTS

| 4,938,798 A * | 7/1990 | Chiba | ................. C23C 14/3414 419/33 |
|---|---|---|---|
| 2006/0071165 A1 | 4/2006 | Tenne et al. | |
| 2010/0304954 A1 * | 12/2010 | Sogabe | ................. B01J 35/1014 502/309 |
| 2017/0047169 A1 * | 2/2017 | Naito | ..................... H01G 9/055 |
| 2017/0348648 A1 | 12/2017 | Beydaghi et al. | |

FOREIGN PATENT DOCUMENTS

| CN | 102161510 | 8/2011 |
| JP | 2012-225863 | 11/2012 |
| JP | 2015-071699 | 4/2015 |
| JP | 2017-063003 | 3/2017 |

OTHER PUBLICATIONS

Marco Righettoni et al., "Annealing dynamics of WO3 by in situ XRD", [Materials Research Bulletin] p. 199-204, Jul. 2014.
International Search Report dated Jan. 29, 2019 with respect to PCT/JP2018/042991.
Li, Y. H. et al., "Local atomic structure modulations activate metal oxide as electrocatalyst for hydrogen evolution in acidic water", Nature Communications, Aug. 19, 2015, vol. 6, 8064, in particular, see supplementary fig. 4, supplementary table 5, methods "Synthesis of catalyst", results "X-ray analyses", discussion.
Hernandez-Uresti, D. B., "Characterization and photocatalytic properties of hexagonal and monoclinic WO3 prepared via microwave-assisted hydrothermal synthesis", Ceramics International, Sep. 16, 2013, vol. 40, pp. 4767-4775, in particular, see table 2, fig. 2, 2. Experimental, 3. Results and discussion.
Wang, J. et al., "Enhanced Activity for CO Oxidation over WO3 Nanolamella Supported Pt Catalyst", ACS Applied Materials & Interfaces, Jun. 26, 2014, vol. 6, pp. 12860-12867, in particular, see p. 12861, right column, lines 18-22.
Kaiser, F. et al., "Spark Plasma Sintering of Tungsten Oxides WOx (2.50≤x≤3): Phase Analysis and Thermoelectric Properties", Crystals, Sep. 5, 2017, vol. 7, 271, in particular, see table 1.
Magneli, A, "Structures of the ReO3-type with Recurrent Dislocations of Atoms.'Homologous Series'of Molybdenum and Tungsten Oxides", Acta Crystallographica, Jun. 1953, vol. 6, pp. 495-500, in particular, see table 3.
Raja, M. et al., "Evaluation of microstructural and electrical properties of WO3-x thin films for p-Si/n-WO3-x/Ag junction diodes", Optik, Aug. 27, 2016, vol. 127, pp. 11009-11019.

* cited by examiner

*Primary Examiner* — James A Fiorito
(74) *Attorney, Agent, or Firm* — IPUSA, PLLC

(57) ABSTRACT

A tungsten trioxide whose $I_{WO2.90}/I_{WO3.00}$ is less than or equal to 0.15 is provided. $I_{WO2.90}/I_{WO3.00}$ indicates a ratio of a peak intensity $I_{WO2.90}$ of a (200) plane of $WO_{2.90}$ to a peak intensity $I_{WO3.00}$ of a (200) plane of $WO_{3.00}$ in an XRD pattern.

2 Claims, No Drawings

TUNGSTEN TRIOXIDE

TECHNICAL FIELD

The present invention relates to a tungsten trioxide.

BACKGROUND ART

Along with the spread of portable electronic devices such as mobile phones and notebook computers, the demand is increasing for a small and lightweight secondary battery having a high energy density. Also, the development of a high-power secondary battery is strongly demanded as a power source for electric vehicles such as hybrid vehicles.

A lithium ion secondary battery, which is a type of non-aqueous electrolyte secondary battery, satisfy such requirements. A lithium ion secondary battery includes a negative electrode, a positive electrode, and an electrolyte solution. A material from and into which lithium can be de-inserted and inserted is used as an active material for the negative electrode and the positive electrode.

Currently, research and development of such lithium ion secondary batteries are being actively carried out. Among them, a lithium ion secondary battery using a layered or spinel-type lithium metal composite oxide as a positive electrode material can generate a voltage of about 4 V, and is therefore being put into practical application as a battery having a high energy density.

Major positive-electrode active materials proposed so far are layered materials including lithium cobalt composite oxides such as lithium cobaltate ($LiCoO_2$) and lithium nickel composite oxides such as lithium nickelate ($LiNiO_2$), and spinel materials including lithium manganese composite oxides such as lithium manganate ($LiMn_2O_4$).

Among them, lithium nickel composite oxides are drawing attention as materials that have good cycle characteristics and low resistance and can generate high power. Also, it is being considered to provide a compound containing tungsten and lithium on the surfaces of lithium nickel composite oxide particles to achieve high capacity and high power.

For example, Patent Document 1 discloses a method for manufacturing a positive-electrode active material for a non-aqueous electrolyte secondary battery. The method includes a mixing step of mixing lithium nickel composite oxide particles, which include primary particles represented by a general formula $Li_zNi_{1-x-y}Co_xM_yO_2$ (where $0.03 \leq x \leq 0.35$, $0.01 \leq y \leq 0.35$, $0.95 \leq z \leq 1.20$, and M is at least one element selected from Mn, V, Mg, Mo, Nb, Ti, and Al) and secondary particles formed by aggregated primary particles, lithium-free tungsten compound powder, and water to obtain a tungsten mixture; and a heat treatment step of heat-treating the tungsten mixture.

Patent Document 1 also discloses using tungsten oxide ($WO_3$) as lithium-free tungsten compound powder.

RELATED-ART DOCUMENT

Patent Document

[Patent Document 1] Japanese Unexamined Patent Application Publication No. 2017-063003

DISCLOSURE OF INVENTION

Problems to be Solved by the Invention

However, when a non-aqueous electrolyte secondary battery is produced using the positive-electrode active material for non-aqueous electrolyte secondary battery obtained according to Patent Document 1, the battery characteristics tend to vary and also tend to become low.

The inventors of the present invention studied the cause of this problem. As a result, the inventors have found out that, in the positive-electrode active material for non-aqueous electrolyte secondary battery, there are cases where the percentage of the compound containing tungsten and lithium disposed on the surfaces of the secondary particles of the lithium nickel composite oxide and the surfaces of the inside primary particles varies among the particles. It is presumed that the variation among the particles in the percentage of the compound containing tungsten and lithium formed on the surfaces of the secondary particles of the lithium nickel composite oxide and the surfaces of the inside primary particles is a cause of the variation in the battery characteristics of the secondary battery using the positive-electrode active material.

An aspect of the present invention provides a tungsten trioxide that when reacted with lithium nickel composite oxide particles, can suppress variation among the particles in the percentage of a compound containing tungsten and lithium.

Means for Solving the Problems

To solve the above problem, according to an aspect of the present invention, a tungsten trioxide whose $I_{WO2.90}/I_{WO3.00}$ is less than or equal to 0.15 is provided. $I_{WO2.90}/I_{WO3.00}$ indicates a ratio of a peak intensity $I_{WO2.90}$ of a (200) plane of $WO_{2.90}$ to a peak intensity $I_{WO3.00}$ of a (200) plane of $WO_{3.00}$ in an XRD pattern.

Advantageous Effect of the Invention

An aspect of the present invention makes it possible to provide a tungsten trioxide that when reacted with lithium nickel composite oxide particles, can suppress variation among the particles in the percentage of a compound containing tungsten and lithium.

DESCRIPTION OF EMBODIMENTS

Embodiments of the present invention are described below with reference to the accompanying drawings. However, the present invention is not limited to the specifically disclosed embodiments, and variations and modifications may be made without departing from the scope of the present invention.

[Tungsten Trioxide]

An example of a configuration of a tungsten trioxide according to an embodiment is described below.

In an XRD pattern of the tungsten trioxide of the present embodiment, $I_{WO2.90}/I_{WO3.00}$, which is a ratio of a peak intensity $I_{WO2.90}$ of the (200) plane of $WO_{2.90}$ to a peak intensity $I_{WO3.00}$ of the (200) plane of $WO_{3.00}$, may be less than or equal to 0.15.

It is possible to reduce the reaction resistance and improve the output characteristics of a positive-electrode active material by using a positive-electrode active material for non-aqueous electrolyte secondary battery (which may also be referred to as a "positive-electrode active material") that includes coated lithium nickel composite oxide particles obtained by forming a compound containing tungsten and lithium on the surfaces of secondary particles of a lithium nickel composite oxide and the surfaces of inside primary particles (which may also be referred to as "lithium nickel composite oxide particles").

However, when a positive-electrode active material including coated lithium nickel composite oxide particles is used, the battery characteristics of secondary batteries using the positive-electrode active material tend to vary. That is, there are cases where sufficient output characteristics cannot be obtained. The inventors of the present invention have studied the cause of this problem and have found out that there are cases where the percentage of the compound containing tungsten and lithium varies among the coated lithium nickel composite oxide particles.

Then, as a result of further study, the inventors have found out that tungsten trioxide, which is one of raw materials, is the cause of variation in the percentage of the compound containing tungsten and lithium among the coated lithium nickel composite oxide particles.

Even if it is sold as high purity tungsten trioxide, which has not been reviewed so far, it may contain $WO_{2.90}$, which is partially oxygen deficient. The inventors of the present invention have also reviewed that $WO_{2.90}$ is less reactive with lithium compounds and more likely to remain as an unreacted product when coated lithium nickel composite oxide particles are generated.

Thus, the inventors have found out that setting the percentage of $WO_{2.90}$ in a tungsten trioxide less than or equal to a predetermined value makes it possible to improve the reactivity of the tungsten trioxide with a lithium compound and to suppress the variation in the percentage of the compound containing tungsten and lithium among the coated lithium nickel composite oxide particles, and have thereby completed the present invention.

The percentage of $WO_{2.90}$ can be evaluated using the ratio of a peak intensity $I_{WO2.90}$ of the (200) plane of $WO_{2.90}$ to a peak intensity $I_{WO3.00}$ of the (200) plane of $WO_{3.00}$ in an XRD pattern of the tungsten trioxide.

In the tungsten trioxide of the present embodiment, as described above, the ratio $I_{WO2.90}/I_{WO3.00}$ of the peak intensity $I_{WO2.90}$ of the (200) plane of $WO_{2.90}$ to the peak intensity $I_{WO3.00}$ of the (200) plane of $WO_{3.00}$ in the XRD pattern is preferably less than or equal to 0.15.

Thus, in the case of the tungsten trioxide of the present embodiment where $I_{WO2.90}/I_{WO3.00}$ is less than or equal to 0.15, the ratio of $WO_{2.90}$ in the tungsten trioxide is sufficiently suppressed. This configuration makes it possible to uniformly form the compound containing tungsten and lithium on the surfaces of the lithium nickel composite oxide particles and is therefore preferable. That is, this configuration makes it possible to suppress the variation, among the coated lithium nickel composite oxide particles, in the percentage of the compound containing tungsten and lithium formed on the surfaces of the lithium nickel composite oxide particles.

When $I_{WO2.90}/I_{WO3.00}$ exceeds 0.15, the tungsten trioxide is subjected to an oxidation treatment by heat-treating the tungsten trioxide being stirred under an oxygen flow to suppress the percentage of $WO_{2.90}$.

$I_{WO2.90}/I_{WO3.00}$ of the tungsten trioxide of the present embodiment is more preferably less than or equal to 0.14, further preferably less than or equal to 0.12, and particularly preferably less than or equal to 0.10.

The lower limit of $I_{WO2.90}/I_{WO3.00}$ may be, but is not limited to, a value greater than or equal to 0.

Also, the tungsten trioxide of the present embodiment preferably has a 10% cumulative particle size greater than or equal to 10 μm, a 50% cumulative particle size greater than or equal to 30 μm and less than or equal to 55 μm, and a 90% cumulative particle size less than or equal to 100 μm.

If the percentage of fine particles of tungsten trioxide is too high, the particles are agglomerated and become difficult to disperse. Also, if the percentage of coarse particles of tungsten trioxide is excessively high, the reaction with the lithium compound is suppressed, and a part of the tungsten trioxide may remain as an unreacted substance.

On the other hand, when the 10% cumulative particle size, the 50% cumulative particle size, and the 90% cumulative particle size of the tungsten trioxide are within the above ranges, the particles of the tungsten trioxide can smoothly disperse, and the reactivity with the lithium compound can be made sufficiently high. Accordingly, the compound including tungsten and lithium can be particularly uniformly formed on the surfaces of the secondary particles of the lithium nickel composite oxide and the surfaces of the inside primary particles.

The upper limit of the 10% cumulative particle size may be, for example, but is not limited to, less than or equal to 25 μm. Also, the lower limit of the 90% cumulative particle size may be, but is not limited to, greater than or equal to 60 μm.

The 10% cumulative particle size (D10) indicates a particle size at a cumulative volume of 10% in a particle size distribution obtained by a laser diffraction scattering method.

The 50% cumulative particle size (D50) indicates a particle size at a cumulative volume of 50% in a particle size distribution obtained by a laser diffraction scattering method.

Also, the 90% cumulative particle size (D90) indicates a particle size at a cumulative volume of 90% in a particle size distribution obtained by a laser diffraction scattering method.

The specific surface area of the tungsten trioxide of the present embodiment is preferably greater than or equal to 0.5 $m^2/g$ and less than or equal to 7.0 $m^2/g$, and is more preferably greater than or equal to 4.0 $m^2/g$ and less than or equal to 6.5 $m^2/g$.

When the specific surface area of the tungsten trioxide is greater than or equal to 0.5 $m^2/g$, the reactivity with the lithium compound can be made sufficiently high, and the compound containing tungsten and lithium can be particularly uniformly formed on the surfaces of lithium nickel composite oxide particles.

Also, setting the specific surface area of the tungsten trioxide at a value less than or equal to 7.0 $m^2/g$ makes it possible to prevent a part of the tungsten trioxide from being changed to $WO_{2.90}$.

Any method may be used to adjust the particle size distribution and the specific surface area of tungsten trioxide. For example, the particle size distribution and the specific surface area may be adjusted and controlled by crushing and/or screening.

[Method for Manufacturing Positive-Electrode Active Material for Non-Aqueous Electrolyte Secondary Battery]

Next, an example of a method of manufacturing the positive-electrode active material for non-aqueous electrolyte secondary battery according to the present embodiment is described.

The manufacturing method of the positive-electrode active material for non-aqueous electrolyte secondary battery according to the present embodiment (which may also be simply referred to as a "positive-electrode active material manufacturing method") may include the following steps.

A mixing step of mixing lithium nickel composite oxide particles, tungsten trioxide, and water to obtain a tungsten mixture. A heat treatment step of heat-treating the tungsten mixture. The lithium nickel composite oxide particles used in the mixing step preferably include primary particles of a lithium nickel composite oxide represented by a general formula $Li_zNi_{1-x-y}Co_xM_yO_{2+\alpha}$ (where $0<x\le0.35$, $0\le y\le0.35$, $0.95\le z\le1.20$, $-0.2\le\alpha\le0.2$, and M is one or more elements selected from Mn, V, Mg, Mo, Nb, Ti, and Al) and secondary particles formed by aggregated primary particles.

Also, the tungsten trioxide described above may be preferably used as the tungsten trioxide used in the mixing step. Therefore, some of the descriptions of the tungsten trioxide are omitted here.

Each step is described below.

(1) Mixing Step

In the mixing step, the lithium nickel composite oxide particles, the tungsten trioxide, and water are mixed to obtain a tungsten mixture of the lithium nickel composite oxide particles and the tungsten trioxide containing water.

The tungsten mixture is heat-treated in a heat treatment step described later so that a lithium compound such as excess lithium existing on the surfaces of the secondary particles of the lithium nickel composite oxide and the surfaces of the inside primary particles can react with the tungsten trioxide. This makes it possible to form a compound containing tungsten and lithium on the surfaces of the lithium nickel composite oxide particles.

Here, the water percentage in the tungsten mixture, i.e., the moisture content, is preferably greater than or equal to 3.5 mass % and less than or equal to 7.5 mass %. Adjusting the water percentage within the above range enables the tungsten mixture to contain a sufficient amount of water even in the heat treatment step so that the compound containing tungsten and lithium can be sufficiently dispersed on the surfaces of the lithium nickel composite oxide particles, and makes it possible to prevent excessive elution of lithium from the lithium nickel composite oxide particles. This is because the compound containing tungsten and lithium can be dispersed more uniformly onto the surfaces of, for example, the primary particles of the lithium nickel composite oxide particles in the heat treatment step by setting the water percentage in the tungsten mixture at a value greater than or equal to 3.5 mass %. Also, setting the water percentage in the tungsten mixture at a value less than or equal to 7.5 mass % makes it possible to prevent excessive elution of lithium from the lithium nickel composite oxide and is therefore preferable.

Any method may be used to produce the lithium nickel composite oxide particles used in the mixing step.

For example, the lithium nickel composite oxide particles may be produced by firing a raw material mixture of a lithium compound such as lithium hydroxide or lithium carbonate and a nickel composite oxide.

Although the composition of the nickel composite oxide is not limited to any specific composition, the nickel composite oxide preferably has a composition that corresponds to the lithium nickel composite oxide to be produced from the raw material mixture.

An example of the nickel composite oxide is a nickel cobalt composite oxide that is represented by a general formula $Ni_{1-x-y}Co_xM_yO_{1+\beta}$ (where $0<x\le0.35$, $0\le y\le0.35$, $-0.2\le\beta\le0.2$, and M is one or more elements selected from Mn, V, Mg, Mo, Nb, Ti, and Al).

The temperature for firing the raw material mixture is not limited to any specific value, but is preferably greater than or equal to 600° C. and less than or equal to 950° C., and more preferably greater than or equal to 700° C. and less than or equal to 900° C. Also, although any firing atmosphere may be used, an oxidizing gas atmosphere is preferable, and an oxidizing gas flow is more preferable. The amount of oxygen in the oxidizing gas is preferably greater than or equal to 18 vol % and less than or equal to 100 vol %. For example, air (atmospheric air), a mixed gas of oxygen and an inert gas, or oxygen may be used.

Immediately after firing the raw material mixture, for example, excess unreacted lithium may be adhering to the surfaces of the lithium nickel composite oxide particles. Therefore, a water washing step is preferably performed before using the lithium nickel composite oxide particles in the mixing step. In the water washing step, the obtained lithium nickel composite oxide particles are added to pure water to form slurry, and the slurry is, for example, filtered to separate the liquid.

When forming the slurry, the concentration (amount) of the lithium nickel composite oxide particles relative to water contained in the slurry is not limited to any specific value. For example, the concentration of the mixed lithium nickel composite oxide particles is preferably greater than or equal to 750 g/L and less than or equal to 2000 g/L, and more preferably greater than or equal to 1000 g/L and less than or equal to 1500 g/L.

When the concentration of the lithium nickel composite oxide particles relative to water contained in the slurry is set at a value greater than or equal to 750 g/L, an appropriate amount of an excess component such as excess lithium can remain adhering to the surfaces of the lithium nickel composite oxide particles. This in turn enables a lithium compound such as excess lithium remaining on the surfaces of the secondary particles of the lithium nickel composite oxide and the surfaces of the inside primary particles after the water washing step to react with the tungsten trioxide. Also, setting the concentration of the lithium nickel composite oxide particles relative to water contained in the slurry at a value less than or equal to 2000 g/L makes it possible to suppress an increase in the viscosity of the slurry and makes it easier to stir the slurry.

Although any type of water may be used for the water washing step, the electric conductivity of the water is preferably less than 10 μS/cm and more preferably less than or equal to 1 μS/cm. Further, the temperature of water is preferably selected such that the temperature of the slurry becomes greater than or equal to 10° C. and less than or equal to 40° C.

Although the time for water washing is not limited to any specific value, the time for water washing is preferably greater than or equal to 5 minutes and less than or equal to 1 hour so that an appropriate amount of an excess component remains adhering to the surfaces of the lithium nickel composite oxide particles and the productivity can also be improved. During the water washing step, the prepared slurry is preferably stirred.

To filter the slurry, for example, a filter press may be used. For example, the amount of water contained in a filtered substance may be adjusted so that the water contained in the filtered substance can be used as a raw material in the mixing step.

In the mixing step, the ratio between the lithium nickel composite oxide particles and the tungsten trioxide is not limited to any specific value. However, they are preferably mixed such that in the positive-electrode active material obtained after the heat treatment step, the ratio of the number of atoms of tungsten to the number of atoms of metal components other than lithium contained in the coated lithium nickel composite oxide particles falls within a desired range.

For this reason, for example, the lithium nickel composite oxide particles and the tungsten trioxide are preferably mixed such that the percentage of the number of atoms of tungsten contained in the tungsten mixture with respect to the total number of atoms of metal components other than lithium contained in the tungsten mixture becomes greater than or equal to 0.01% and less than or equal to 3.0%. Particularly, the percentage is preferably greater than or equal to 0.05% and less than or equal to 2.0%, and more preferably greater than or equal to 0.05% and less than or equal to 1.0%.

Further, the temperature for mixing and kneading the lithium nickel composite oxide particles, the tungsten trioxide, and water in the mixing step is not limited to any specific value. For example, the temperature is preferably greater than or equal to 10° C. and less than or equal to 50° C., and more preferably greater than or equal to 20° C. and less than or equal to 50° C.

Setting the temperature in the mixing step at 50° C. or lower makes it possible to uniformly disperse the tungsten trioxide and water among the lithium nickel composite oxide particles while suppressing the decrease in the moisture content in the tungsten mixture.

Also, mixing the materials at a temperature greater than or equal to 10° C. makes it possible to elute an excess lithium compound during the mixing step and makes it possible to more uniformly disperse tungsten onto the surfaces of the primary particles of the lithium nickel composite oxide.

In the mixing step, any method may be used to mix the lithium nickel composite oxide particles, the tungsten trioxide, and water. For example, a general mixer may be used.

One or more mixers selected from, for example, a shaker mixer, a Loedige mixer, a Julia mixer, and a V blender may be used, and it is preferable to sufficiently mix the materials to such an extent that the shape of the lithium nickel composite oxide particles is not damaged.

(2) Heat Treatment Step

In the heat treatment step, the tungsten mixture is heat-treated.

Heat treatment conditions in the heat treatment step are not limited to any specific conditions, and are preferably selected so that a compound containing tungsten and lithium can be formed and disposed on the surfaces of the lithium nickel composite oxide particles.

The heat treatment step may include, for example, two heat treatment steps.

In a first heat treatment step, the lithium compound on the surfaces of the primary particles of the lithium nickel composite oxide particles is caused to react with the tungsten trioxide to form a compound containing tungsten and lithium, and the compound containing tungsten and lithium is dissolved and dispersed in water. In a second heat treatment step, heat treatment is performed at a temperature higher than the heat treatment temperature in the first heat treatment step to form a compound containing tungsten and lithium on the surfaces of the secondary particles of the lithium nickel composite oxide particles and the surfaces of the inside primary particles.

In the first heat treatment step, by heating the tungsten mixture, not only the lithium eluted in the mixture but also the lithium compound remaining on the surfaces of the primary particles of the lithium nickel composite oxide particles can be caused to react with the tungsten trioxide. As a result, a compound containing tungsten and lithium can be generated.

Generating the compound containing tungsten and lithium makes it possible to significantly reduce excess lithium in the obtained positive-electrode active material and improve the battery characteristics.

The compound containing tungsten and lithium formed by the first heat treatment step is dissolved by the water in the tungsten mixture and can be dispersed onto the surfaces of the secondary particles of the lithium nickel composite oxide and the surfaces of the inside primary particles.

As described above, in the first heat treatment step, the lithium compound is reacted with the tungsten trioxide, and the compound containing tungsten and lithium is dispersed. Accordingly, the water preferably remains until the reaction proceeds sufficiently and the compound containing tungsten and lithium is dispersed.

Therefore, the heat treatment temperature in the first heat treatment step is preferably greater than or equal to 60° C. and less than or equal to 80° C.

Setting the heat treatment temperature in the first heat treatment step at 60° C. or higher makes it possible to cause the reaction between the lithium compound and the tungsten trioxide to proceed sufficiently and to sufficiently generate the compound containing tungsten and lithium.

Also, setting the heat treatment temperature in the first heat treatment step at 80° C. or lower makes it possible to suppress the evaporation of water and facilitate the dispersion of the compound containing tungsten and lithium.

The heat treatment time of the first heat treatment step is not limited to any specific value. For example, the heat treatment time of the first heat treatment step is preferably greater than or equal to 0.5 hours and less than or equal to 2 hours.

In the second heat treatment step, heat treatment is performed at a temperature higher than the heat treatment temperature of the first heat treatment step so that the water in the tungsten mixture is sufficiently evaporated and the compound containing tungsten and lithium can be formed on the surfaces of the secondary particles of the lithium nickel composite oxide particles and the surfaces of the inside primary particles.

The heat treatment temperature of the second heat treatment step is also not limited to any specific value. For example, the heat treatment temperature of the second heat treatment step is preferably greater than or equal to 100° C. and less than or equal to 200° C.

Setting the temperature at 100° C. or higher makes it possible to sufficiently evaporate the water in the tungsten mixture and to sufficiently form the compound containing tungsten and lithium on the surfaces of the secondary particles of the lithium nickel composite oxide particles and the surfaces of the inside primary particles.

Also, setting the temperature at 200° C. or lower makes it possible to certainly prevent, for example, formation of necking between the lithium nickel composite oxide particles.

The heat treatment time of the second heat treatment step is not limited to any specific value, but is preferably greater than or equal to 5 hours and less than or equal to 15 hours to sufficiently evaporate the water and form a compound containing tungsten and lithium.

Decarbonated air, an inert gas, or a vacuum atmosphere is preferably used as the atmosphere for the heat treatment step to prevent a reaction between moisture or carbonic acid in the atmosphere and lithium on the surfaces of the lithium nickel composite oxide particles.

In the above-described method of manufacturing the positive-electrode active material for non-aqueous electrolyte secondary battery of the present embodiment, the tungsten trioxide is used as one of the raw materials. When generating coated lithium nickel composite oxide particles, this method makes it possible to suppress the variation in the percentage of the compound containing tungsten and lithium among the particles. Specifically, the above method makes it possible to make the relative standard deviation of the ratio of the number of atoms of tungsten to the number of atoms of metal components other than lithium contained in the coated lithium nickel composite oxide particles, which corresponds to the variation in the percentage of the compound containing tungsten and lithium among the coated lithium nickel composite oxide particles, less than or equal to 0.4.

[Positive-Electrode Active Material for Non-Aqueous Electrolyte Secondary Battery]

An example of a configuration of the positive-electrode active material for non-aqueous electrolyte secondary battery of the present embodiment is described below.

The positive-electrode active material for non-aqueous electrolyte secondary battery of the present embodiment can be manufactured by the positive-electrode active material manufacturing method described above. Therefore, some of the descriptions given above are omitted here.

The positive-electrode active material for non-aqueous electrolyte secondary battery of the present embodiment may include multiple coated lithium nickel composite oxide particles.

The coated lithium nickel composite oxide particles include primary particles of a lithium nickel composite oxide represented by a general formula $Li_zNi_{1-x-y}Co_xM_yO_{2+\alpha}$ (where $0<x\leq0.35$, $0\leq y\leq0.35$, $0.95\leq z\leq1.20$, $-0.2\leq\alpha\leq0.2$, and M is one or more elements selected from Mn, V, Mg, Mo, Nb, Ti, and Al) and secondary particles formed by aggregated primary particles. A compound containing tungsten and lithium is formed on the surfaces of the secondary particles and the surfaces of the inside primary particles.

Also, the present embodiment makes it possible to make the relative standard deviation of the ratio of the number of atoms of tungsten to the number of atoms of metal components other than lithium contained in the coated lithium nickel composite oxide particles less than or equal to 0.4.

The positive-electrode active material of the present embodiment may include multiple coated lithium nickel composite oxide particles. That is, the positive-electrode active material may be formed as coated lithium nickel composite oxide powder. The positive-electrode active material of the present embodiment may include any component in addition to the coated lithium nickel composite oxide powder, or may be consisted of the coated lithium nickel composite oxide powder.

The coated lithium nickel composite oxide particles preferably include primary particles of a lithium nickel composite oxide represented by a general formula $Ni_{1-x-y}Co_xM_yO_{2+\alpha}$ (where $0<x\leq0.35$, $0\leq y\leq0.35$, $0.95\leq z\leq1.20$, $-0.2\leq\alpha\leq0.2$, and M is one or more elements selected from Mn, V, Mg, Mo, Nb, Ti, and Al) and secondary particles. This composition of the lithium nickel composite oxide in the coated lithium nickel composite oxide particles makes it possible to achieve a high charging-discharging capacity.

The coated lithium nickel composite oxide particles may include a compound containing tungsten and lithium on the surfaces of the secondary particles of the lithium nickel composite oxide and on the surfaces of the inside primary particles.

Using a coated lithium nickel composite oxide obtained by forming a compound containing tungsten and lithium on the surfaces of lithium nickel composite oxide particles makes it possible to improve the output characteristics while maintaining or improving the charging-discharging capacity. This configuration can also improve the cycle characteristics.

Generally, when the surfaces of lithium nickel composite oxide particles are completely covered with a different compound, the migration (intercalation) of lithium ions is greatly restricted, and the high capacity property of the lithium nickel composite oxide may be reduced. However, as described above, a compound containing tungsten and lithium has a high lithium-ion conductivity and therefore has an effect of facilitating the migration of lithium ions. Therefore, forming such a compound on the surfaces of the lithium nickel composite oxide particles makes it possible to form a conduction path of lithium at an interface with the electrolyte solution. Accordingly, the coated lithium nickel composite oxide particles where a compound containing tungsten and lithium is formed on the surface of the lithium nickel composite oxide and the positive-electrode active material including the coated lithium nickel composite oxide particles can reduce the reaction resistance and improve the output characteristics.

Reducing the reaction resistance of the positive-electrode active material makes it possible to suppress the voltage loss in a battery and increase the output voltage, and thereby makes it possible to improve the output characteristics as described above. Also, because the migration of lithium is sufficient in the positive electrode, the battery capacity can be improved. Further, reducing the reaction resistance makes it possible to reduce the load on the positive-electrode active material during charging and discharging and thereby makes it possible to improve the cycle characteristics.

The composition of the compound containing tungsten and lithium is not limited to any specific composition containing tungsten and lithium. However, tungsten and lithium are preferably in the form of a lithium tungstate. For example, it is preferably one or more compounds selected from $Li_2WO_4$, $Li_4WO_5$, $Li_6WO_6$, $Li_2W_4O_{13}$, $Li_2W_2O_7$, $Li_6W_2O_9$, $Li_2W_2O_7$, $Li_2W_5O_{16}$, $Li_9W_{19}O_{55}$, $Li_3W_{10}O_{30}$, $Li_{18}W_5O_{15}$, and a hydrate of any of these compounds.

Forming a lithium tungstate is preferable because it can further increase the lithium ion conductivity and further increase the effect of reducing the reaction resistance.

The compound containing tungsten and lithium may be formed on the surfaces of the secondary particles of the lithium nickel composite oxide and the surfaces of the inside primary particles as described above. However, the compound containing tungsten and lithium may not necessary completely cover the surfaces of the particles and may be formed on at least parts of the surfaces of the particles.

As described above, forming the compound containing tungsten and lithium on the surfaces of the secondary particles of the lithium nickel composite oxide particles and the surfaces of the inside primary particles and thereby forming the coated lithium nickel composite oxide particles make it possible to suppress the reaction resistance of the positive-electrode active material and improve the output characteristics.

However, as described above, when a positive-electrode active material including a coated lithium nickel composite oxide is used for secondary batteries, there are cases where the battery characteristics vary and are even deteriorated. In other words, there are cases where sufficient output characteristics are not obtained. The inventors of the present invention have studied the cause of this problem and have found out that there is variation in the percentage of a compound containing tungsten and lithium among the coated lithium nickel composite oxide particles. It is supposed that the variation among the lithium nickel composite oxide particles in the percentage of the compound containing tungsten and lithium formed on the surfaces of the particles is a cause of the variation in the battery characteristics of the secondary battery using the positive-electrode active material.

For this reason, in the positive-electrode active material of the present embodiment, the relative standard deviation of the ratio of the number of atoms of tungsten to the number of atoms of metal components other than lithium contained in the coated lithium nickel composite oxide particles, which corresponds to the variation in the percentage of the compound containing tungsten and lithium among the coated lithium nickel composite oxide particles, is preferably less than or equal to 0.4.

The relative standard deviation is also called a coefficient of variation, and is obtained by dividing a standard deviation by an average value. Accordingly, the relative standard deviation can be applied even when the average value varies, i.e., even when the amount of tungsten varies.

To calculate the relative standard deviation, for each of multiple coated lithium nickel composite oxide particles in the positive-electrode active material of the present embodiment, the ratio of the number of atoms of tungsten to the number of atoms of metal components other than lithium is measured and calculated.

The ratio of the number of atoms of tungsten to the number of atoms of the metal components other than lithium contained in each coated lithium nickel composite oxide particle may be calculated by, for example, formula (1) below.

$$N_W/(N_{Ni}+N_{Co}+N_M+N_W) \quad (1)$$

In formula (1) above, $N_W$ indicates the number of atoms of tungsten included in each coated lithium nickel composite oxide particle. $N_{Ni}$, $N_{Co}$, and $N_M$ indicate the number of atoms of nickel, the number of atoms of cobalt, and the number of atoms of M contained in the coated lithium nickel composite oxide particle, respectively. As described above, M is one or more elements selected from Mn, V, Mg, Mo, Nb, Ti, and Al.

As a non-limiting example, for the coated lithium nickel composite oxide particle, the number of atoms of, for example, tungsten in formula (1) may be measured by energy dispersive X-ray spectrometry (EDS). The number of coated lithium nickel composite oxide particles to be measured is not limited to any specific value, but is preferably greater than or equal to 5 and less than or equal to 100, and more preferably greater than or equal to 10 and less than or equal to 20.

Then, based on the obtained measurements, the average value and the standard deviation of the ratio of the number of atoms of tungsten to the number of atoms of metal components other than lithium are calculated, and the relative standard deviation is calculated based on the average value and the standard deviation.

Making the relative standard deviation of the ratio of the number of atoms of tungsten to the number of atoms of metal components other than lithium contained in the coated lithium nickel composite oxide particles less than or equal to 0.4 makes it possible to stably improve the battery characteristics of a secondary battery using a positive-electrode active material containing the coated lithium nickel composite oxide particles. This indicates that the coated lithium nickel composite oxide particles in the positive-electrode active material contain or are coated by substantially the same ratio of the compound of tungsten and lithium, and the coated lithium nickel composite oxide particles contained in the positive-electrode active material have uniform characteristics.

The relative standard deviation is more preferably less than or equal to 0.35.

The relative standard deviation may be greater than or equal to 0.

The amount of tungsten contained in the coated lithium nickel composite oxide particles in the positive-electrode active material of the present embodiment is not limited to any specific value. However, the ratio of the number of atoms of tungsten to the number of atoms of metal components other than lithium contained in each coated lithium nickel composite oxide particle is preferably greater than or equal to 0.01% and less than or equal to 3.0%, and more preferably greater than or equal to 0.05% and less than or equal to 2.0%. The ratio is particularly preferably greater than or equal to 0.05% and less than or equal to 1.0%.

The ratio (in percentage) of the number of atoms of tungsten to the number of atoms of metal components other than lithium contained in the coated lithium nickel composite oxide particles may be calculated by formula (2) below.

$$N_W/(N_{Ni}+N_{Co}+N_M+N_W) \times 100 \quad (2)$$

$N_W$ in formula (2) above indicates the number of atoms of tungsten contained in each coated lithium nickel composite oxide particle. Also, $N_{Ni}$, $N_{Co}$, and $N_M$ indicate the number of atoms of nickel, the number of atoms of cobalt, and the number atoms of M contained in the coated lithium nickel composite oxide particle, respectively. As described above, M is one or more elements selected from Mn, V, Mg, Mo, Nb, Ti, and Al.

By setting the ratio of the number of atoms of tungsten to the number of atoms of the metal components other than lithium contained in the coated lithium nickel composite oxide particles at a value greater than or equal to 0.01%, it is possible to sufficiently cover the surfaces of the secondary particles of the lithium nickel composite oxide and the surfaces of the inside primary particles with the compound containing tungsten and lithium. This configuration can particularly improve the output characteristics and is therefore preferable.

Also, setting the ratio of the number of atoms of tungsten to the number of atoms of the metal components other than lithium contained in the coated lithium nickel composite oxide particles at a value less than or equal to 3.0% makes it possible to prevent excessively coating the particles with the compound containing tungsten and lithium and is therefore preferable.

[Non-Aqueous Electrolyte Secondary Battery]

Next, an example of a configuration of the non-aqueous electrolyte secondary battery of the present embodiment is described.

The non-aqueous electrolyte secondary battery of the present embodiment may include a positive electrode using the above-described positive-electrode active material as a positive electrode material.

First, an example of a structure of the non-aqueous electrolyte secondary battery of the present embodiment is described.

The non-aqueous electrolyte secondary battery of the present embodiment may have substantially the same structure as a general non-aqueous electrolyte secondary battery except that the above-described positive-electrode active material is used as the positive electrode material.

Specifically, the non-aqueous electrolyte secondary battery of the present embodiment may include, for example, a case and a positive electrode, a negative electrode, an electrolyte solution, and a separator that are housed in the case.

More specifically, the positive electrode and the negative electrode are stacked via a separator to form an electrode body, and the formed electrode body is impregnated with the electrolyte solution. Then, a positive electrode current collector of the positive electrode and a positive electrode terminal that leads to the outside are connected to each other using, for example, a current collecting lead, a negative electrode current collector of the negative electrode and a negative electrode terminal that leads to the outside are connected to each other using, for example, a current collecting lead, and the resulting components are encapsulated in the case.

The structure of the non-aqueous electrolyte secondary battery of the present embodiment is not limited to the above example. Also, the non-aqueous electrolyte secondary battery may have various external shapes such as a tubular shape and a laminated shape.

Exemplary configurations of the respective parts are described below.

(Positive Electrode)

First, the positive electrode is described.

The positive electrode is a sheet-shaped component and may be formed, for example, by applying a positive electrode mixture paste containing the above-described positive-electrode active material onto the surface of a current collector made of aluminum foil and drying the positive electrode mixture paste. Then, the positive electrode is appropriately processed according to a target battery. Examples of such processes include a cutting process of cutting the positive electrode into a size suitable for a target battery and a pressure compression process performed with, for example, a roll press to increase the electrode density.

The positive electrode mixture paste may be formed by adding a solvent to the positive electrode mixture and kneading the positive electrode mixture. The positive electrode mixture may be formed by mixing the above-described positive-electrode active material in powder form, a conductive material, and a binder.

The conductive material is added to give appropriate conductivity to the electrode. The material of the conductive material is, for example, but is not limited to, graphite such as natural graphite, artificial graphite, or expanded graphite, or a carbon black material such as acetylene black or Ketjenblack (registered trademark).

The binder binds the positive-electrode active material. The binder used for the positive electrode mixture is, for example, but is not limited to, one or more substances selected from polyvinylidene fluoride (PVDF), polytetrafluoroethylene (PTFE), fluororubber, ethylene propylene diene rubber, styrene butadiene, cellulosic resin, and polyacrylic acid.

For example, activated carbon may be added to the positive electrode mixture. Adding, for example, activated carbon to the positive electrode mixture makes it possible to increase the electric double layer capacity of the positive electrode.

The solvent has a function to dissolve the binder and enable the positive-electrode active material, the conductive material, and the activated carbon to be dispersed in the binder. The solvent is, for example, but is not limited to, an organic solvent such as N-methyl-2-pyrrolidone.

The mixing ratios of the substances in the positive electrode mixture paste are not limited to any specific values, and may be, for example, the same as those in the case of the positive electrode of a general non-aqueous electrolyte secondary battery. For example, when the solid content of the positive electrode mixture excluding the solvent is 100 mass parts, the content of the positive-electrode active material may be greater than or equal to 60 mass parts and less than or equal to 95 mass parts, the content of the conductive material may be greater than or equal to 1 mass part and less than or equal to 20 mass parts, and the content of the binder may be greater than or equal to 1 mass part and less than or equal to 20 mass parts.

The method of manufacturing the positive electrode is not limited to the above-described method. For example, the positive electrode may also be manufactured by press-molding the positive electrode mixture or the positive electrode paste and then drying the molded object in a vacuum atmosphere.

(Negative Electrode)

The negative electrode is a sheet-shaped component, and may be comprised of, for example, metal lithium or a lithium alloy. Also, the negative electrode may be formed by applying a negative electrode mixture paste to the surface of a metal foil current collector made of, for example, copper and by drying the negative electrode mixture paste.

Although the components and the composition of the negative electrode mixture paste and the material of the current collector are different from those of the positive electrode, the negative electrode is formed by a method that is substantially the same as the positive electrode manufacturing method described above, and similarly to the positive electrode, various processes may be performed on the negative electrode as necessary.

The negative electrode mixture paste may be formed by adding an appropriate solvent to a negative electrode mixture obtained by mixing a negative-electrode active material and a binder.

For example, the negative electrode active material may be a substance containing lithium such as metal lithium or a lithium alloy, or an inserting substance capable of inserting and de-inserting lithium ions.

The inserting substance is, for example, but is not limited to, one or more substances selected from natural graphite, artificial graphite, an organic compound firing substance such as phenol resin, and powder of a carbon material such as coke.

When such an inserting material is used for the negative electrode active material, similarly to the positive electrode, a fluorine-containing resin such as PVDF may be used as the binder, and an organic solvent such as N-methyl-2-pyrrolidone may be used as the solvent for dispersing the negative electrode active material in the binder.

(Separator)

The separator is disposed between the positive electrode and the negative electrode and has a function to separate the positive electrode from the negative electrode and hold the electrolyte solution.

As a material of the separator, a thin film formed of, for examples, polyethylene or polypropylene and having a large number of fine pores may be used. However, any material having the above-described function may be used for the separator.

(Electrolyte Solution)

The electrolyte solution is obtained by dissolving a lithium salt used as a supporting salt in an organic solvent.

The organic solvent may be implemented by a single substance or a mixture of two or more substances selected from cyclic carbonates such as ethylene carbonate, propylene carbonate, butylene carbonate, and trifluoropropylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxyethane; sulfur compounds such as ethylmethylsulfone or butanesultone; and phosphorus compounds such as triethyl phosphate and trioctyl phosphate.

As the supporting salt, for example, $LiPF_6$, $LiBF_4$, $LiClO_4$, $LiAsF_6$, $LiN (CF_3SO_2)_2$, or a composite salt of these salts may be used.

The electrolyte solution may include, for example, a radical scavenger, a surfactant, and/or a flame retardant to improve the battery characteristics.

In the non-aqueous electrolyte secondary battery of the present embodiment described above, an electrolyte solution (non-aqueous electrolyte solution) is used as the electrolyte. However, the non-aqueous electrolyte secondary battery of the present embodiment is not limited to this example. For example, a solid electrolyte may be used as the electrolyte (non-aqueous electrolyte). A solid electrolyte can withstand a high voltage. Solid electrolytes include an inorganic solid electrolyte and an organic solid electrolyte.

Examples of inorganic solid electrolytes include an oxide-based solid electrolyte and a sulfide-based solid electrolyte.

The oxide-based solid electrolyte is not specifically limited. For example, an oxide-based solid electrolyte including oxygen (O) and having a lithium ion conductivity and an electronic insulation property may be preferably used. The oxide-based solid electrolyte may be implemented by one or more substances selected from, for example, lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_XTi_{2-x}(PO_4)_3$ ($0 \leq X \leq 1$), $Li_{1+x}Al_XGe_{2-x}(PO_4)_3$ ($0 \leq X \leq 1$), $LiTi_2(PO_4)_3$, $Li_{3x}La_{2/3-x}TiO_3$ ($0 \leq X \leq 2/3$), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$.

Any sulfide-based solid electrolyte may be used. For example, a sulfide-based solid electrolyte including sulfur (S) and having a lithium ion conductivity and an electronic insulation property may be preferably used. The sulfide-based solid electrolyte may be implemented by one or more substances selected from, for example, $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$.

An inorganic solid electrolyte other than those described above may also be use. For example, $Li_3N$, $LiI$, or $Li_3N$—$LiI$—$LiOH$ may be used as the inorganic solid electrolyte.

The organic solid electrolyte may be any polymer compound having an ion conductivity. For example, the organic solid electrolyte may be polyethylene oxide, polypropylene oxide, or a copolymer of these compounds. Also, the organic solid electrolyte may include a supporting salt (lithium salt).

When a non-aqueous electrolyte secondary battery is produced using a solid electrolyte as the electrolyte, i.e., implemented as an all-solid-state battery, the configuration of the non-aqueous electrolyte secondary battery other than the configuration of the positive-electrode active material may be changed from the above-described configuration as necessary.

The non-aqueous electrolyte secondary battery of the present embodiment includes a positive electrode using the above-described positive-electrode active material. For example, this configuration makes it possible to reduce the reaction resistance in the positive electrode and provide a non-aqueous electrolyte secondary battery with a high battery capacity.

EXAMPLES

Below, the present invention is described in more detail with reference to examples. However, the present invention is not limited to the following examples.

Example 1

A positive-electrode active material was manufactured using a tungsten trioxide and an evaluation was performed.

Also, the tungsten trioxide used as a material was also evaluated.

First, evaluation methods are described.

(XRD Peak Intensity Ratio)

The XRD pattern of the tungsten trioxide was measured using a powder X-ray diffractometer (Rigaku Corporation, model: Ultima IV). The following measurement conditions were used: radiation source: CuKα ray, tube voltage: 40 kV, tube current: 40 mA, sampling width: 0.02 degrees, scan speed: 2.0 degrees/min, divergence slit: 1 degree, scattering slit: 1 degree, and light receiving slit: 0.3. mm.

Based on the obtained XRD pattern, the peak intensity of the (200) plane of $WO_{2.90}$ and the peak intensity of the (200) plane of $WO_{3.00}$ were calculated, and $I_{WO2.90}/I_{WO3.00}$ was calculated as an XRD peak intensity ratio. (10% cumulative particle size, 50% cumulative particle size, 90% cumulative particle size)

The particle size distribution of the tungsten trioxide was measured using a laser diffraction/scattering particle size analyzer (Model: HRA9320 X-100, Nikkiso Co., Ltd.). Then, based on the obtained particle size distribution, a 10% cumulative particle size, a 50% cumulative particle size, and a 90% cumulative particle size were obtained.

(Specific Surface Area)

The specific surface area of the tungsten trioxide was evaluated using a full automated specific BET analyzer (Model: Macsorb HM model-1220, Mountech Co., Ltd.).

(Relative Standard Deviation of the Ratio of the Number of Atoms of Tungsten to the Number of Atoms of Metal Components Other than Lithium Contained in Coated Lithium Nickel Composite Oxide Particles)

A positive-electrode active material prepared using the tungsten trioxide was fixed on a carbon tape and observed with a field emission scanning electron microscope (Model: JSM-7001F, JEOL Ltd.) without performing a conductivity treatment on its surface. The observation conditions were as follows: acceleration voltage 5 kV, WD=10 mm, and detector=reflected electron.

Then, on 10 arbitrarily-selected lithium nickel composite oxide particles with a particle size of 10 μm or more, elemental analysis was performed with EDS to measure atomic concentrations of Ni, Co, Al, and W.

Next, based on the obtained atomic concentrations, the ratio of the number of atoms of tungsten to the number of atoms of metal components other than lithium contained in the coated lithium nickel composite oxide particles was calculated by formula (1) below.

$$N_W/(N_{Ni}+N_{Co}+N_{Al}+N_W) \quad (1)$$

$N_W$ in formula (1) indicates the number of atoms of tungsten contained in the coated lithium nickel composite oxide particles. $N_{Ni}$, $N_{Co}$, and $N_{Al}$ indicate, respectively, the number of atoms of nickel, the number of atoms of cobalt, and the number of atoms of aluminum or atoms M, which are contained in the coated lithium nickel composite oxide particles.

Then, an average value and a standard deviation were obtained from the calculated values, and a relative standard deviation was calculated by dividing the standard deviation by the average value.

(Ratio of the Number of Atoms of Tungsten to the Number of Atoms of Metal Components Other than Lithium Contained in Coated Lithium Nickel Composite Oxide Particles)

The obtained positive-electrode active material was fixed on a carbon tape and observed with the field emission scanning electron microscope without performing a conductivity treatment on its surface. The observation conditions were as follows: acceleration voltage 5 kV, WD=10 mm, and detector=reflected electron.

Then, on one arbitrarily-selected lithium nickel composite oxide particle with a particle size of 10 μm or more, elemental analysis was performed with EDS to measure atomic concentrations of Ni, Co, Al, and W.

Next, based on the obtained atomic concentrations, the ratio of the number of atoms of tungsten to the number of atoms of metal components other than lithium contained in the coated lithium nickel composite oxide particle was calculated by formula (2) below.

$$N_W/(N_{Ni}+N_{Co}+N_M+N_W) \times 100 \quad (2)$$

$N_W$ in formula (2) indicates the number of atoms of the tungsten contained in the coated lithium nickel composite oxide particles. Also, $N_{Ni}$, $N_{Co}$, and $N_{Al}$ indicate, respectively, the number of atoms of nickel, the number of atoms of cobalt, and the number of atoms of Al or atoms M, which are contained in the coated lithium nickel composite oxide particle.

Example 1

Anhydrous lithium hydroxide and a nickel composite oxide represented by $Ni_{0.91}Co_{0.045}Al_{0.045}O$ are weighed and mixed such that Li/Me representing the ratio of the number of atoms of lithium (Li) to the number of atoms of metals (Me) other than lithium becomes 1.02.

The metals other than lithium indicate metal components contained in the nickel composite oxide, i.e., Ni, Co, and Al. The used nickel composite oxide was prepared by roasting a nickel composite hydroxide produced by a crystallization method in an atmosphere (oxygen: 21 vol %) at 500° C.

Next, the mixture was put in a saggar and fired with a roller hearth kiln by keeping the mixture in an atmosphere with an oxygen concentration of 80 vol % or more at 765° C. for 220 minutes to produce a lithium nickel composite oxide.

Then, 6.0 L of ion-exchanged water was added to 7.5 kg of the particles (powder) of the obtained lithium metal composite oxide represented by $Li_{1.02}Ni_{0.91}Co_{0.045}Al_{0.045}O_2$ to form slurry.

The electric conductivity of the used ion-exchanged water was 5 μS/cm.

The slurry was stirred for 10 minutes and then filtered with a filter press (water washing step).

Next, 26.8 g of tungsten trioxide was added to the filtered substance such that the ratio of the number of atoms of tungsten to the number of atoms of metal components other than lithium contained in lithium nickel composite oxide particles became 0.15%, and they were mixed at a room temperature (25° C.) for 5 minutes to prepare a tungsten mixture. A shaker mixer was used for mixing.

In this example, a tungsten trioxide having characteristics indicated in Table 1 was used. The tungsten trioxide was prepared to have the characteristics indicated in Table 1 by heat-treating a commercially available tungsten trioxide while stirring the tungsten trioxide in an oxygen flow and then crushing the heat-treated tungsten trioxide with a hammer mill.

The moisture content of the obtained tungsten mixture was 4.5 mass %.

Next, the tungsten mixture was heat-treated at 70 for 1.0 hour in a decarbonated air atmosphere (first heat treatment step), and was then heat-treated at an increased temperature of 170° C. for 6 hours (second heat treatment step) to obtain a positive-electrode active material.

Evaluation results of the obtained positive-electrode active material are indicated in Table 1.

Examples 2-5

Positive-electrode active materials were generated and evaluated in a manner similar to Example 1 except that tungsten trioxides with different characteristics indicated in Table 1 were used. Each of the tungsten trioxides having the characteristics indicated in Table 1 were prepared by heat-treating a commercially available tungsten trioxide while stirring the tungsten trioxide in an oxygen flow and then crushing the heat-treated tungsten trioxide with a hammer mill.

Example 6

Anhydrous hydroxide lithium and a nickel composite oxide represented by $Ni_{0.88}Co_{0.09}Al_{0.03}O$ were weighed and mixed such that Li/Me indicating the ratio of the number of atoms of lithium (Li) to the number of atoms of metals (Me) other than lithium becomes 1.02.

The metals other than lithium indicate metal components contained in the nickel composite oxide, i.e., Ni, Co, and Al. The used nickel composite oxide was prepared by roasting a nickel composite hydroxide produced by a crystallization method in an atmosphere (oxygen: 21 vol %) at 500° C.

Next, the mixture was put in a saggar and fired with a roller hearth kiln by keeping the mixture in an atmosphere with an oxygen concentration of 80 vol % or more at 765° C. for 220 minutes to produce a lithium nickel composite oxide.

Then, 6.0 L of ion-exchanged water was added to 7.5 kg of the particles (powder) of the obtained lithium metal composite oxide represented by $Li_{1.02} Ni_{0.88}Co_{0.09} Al_{0.03}O_2$ to form slurry.

The electric conductivity of the used ion-exchanged water was 5 μS/cm.

The slurry was stirred for 10 minutes and then filtered with a filter press (water washing step).

Next, 26.8 g of tungsten trioxide was added to the filtered substance such that the ratio of the number of atoms of tungsten to the number of atoms of metal components other than lithium contained in lithium nickel composite oxide particles became 0.15%, and they were mixed at a room temperature (25° C.) for 5 minutes to prepare a tungsten mixture. A shaker mixer was used for mixing.

In this example, a tungsten trioxide having characteristics indicated in Table 1 was used. The tungsten trioxide was prepared to have the characteristics indicated in Table 1 by heat-treating a commercially available tungsten trioxide while stirring the tungsten trioxide in an oxygen flow and then crushing the heat-treated tungsten trioxide with a hammer mill.

The moisture content of the obtained tungsten mixture was 4.5 mass %.

Next, the tungsten mixture was heat-treated at 70° C. for 1.0 hour in a decarbonated air atmosphere (first heat treatment step), and was then heat-treated at an increased temperature of 170° C. for 6 hours (second heat treatment step) to obtain a positive-electrode active material.

Evaluation results of the obtained positive-electrode active material are indicated in Table 1.

Examples 7-10

Positive-electrode active materials were generated and evaluated in a manner similar to Example 6 except that tungsten trioxides with different characteristics indicated in Table 1 were used. The tungsten trioxide was prepared to have the characteristics indicated in Table 1 by heat-treating a commercially available tungsten trioxide while stirring the tungsten trioxide in an oxygen flow and then crushing the heat-treated tungsten trioxide with a hammer mill.

Comparative Examples 1-4

Positive-electrode active materials were generated and evaluated in a manner similar to Example 1 except that tungsten trioxides with different characteristics indicated in Table 1 were used.

In Comparative Example 2, a commercially available tungsten trioxide was used without change. In Comparative Examples 1, 3, and 4, each of the tungsten trioxides was prepared to have the corresponding characteristics indicated in Table 1 by heat-treating a commercially available tungsten trioxide while stirring the tungsten trioxide in an oxygen flow and then crushing the heat-treated tungsten trioxide with a hammer mill.

Comparative Examples 5-8

Positive-electrode active materials were generated and evaluated in a manner similar to Example 6 except that tungsten trioxides with different characteristics indicated in Table 1 were used.

In Comparative Example 6, a commercially available tungsten trioxide was used without change. In Comparative Examples 5, 7, and 8, each of the tungsten trioxides was prepared to have the corresponding characteristics indicated in Table 1 by heat-treating a commercially available tungsten trioxide while stirring the tungsten trioxide in an oxygen flow and then crushing the heat-treated tungsten trioxide with a hammer mill.

TABLE 1

| | Tungsten Trioxide | | | | | Coated Lithium Nickel Composite Oxide Particles | |
|---|---|---|---|---|---|---|---|
| | XRD Peak Intensity Ratio | Grain Size D50 μm | Grain Size D10 μm | Grain Size D90 μm | Specific Surface Area m²/g | Relative standard deviation of the ratio of the number of atoms of tungsten to the number of atoms of metal components other than lithium | Ratio (%) of the number of atoms of tungsten to the number of atoms of metal components other than lithium |
| Example 1 | 0.08 | 40 | 15 | 75 | 5.8 | 0.10 | 0.15 |
| Example 2 | 0.12 | 48 | 20 | 100 | 4.8 | 0.25 | 0.15 |
| Example 3 | 0.13 | 40 | 15 | 70 | 0.9 | 0.30 | 0.15 |
| Example 4 | 0.10 | 40 | 15 | 70 | 5.5 | 0.10 | 0.07 |
| Example 5 | 0.11 | 43 | 20 | 65 | 6.5 | 0.11 | 0.80 |
| Example 6 | 0.08 | 40 | 15 | 75 | 5.8 | 0.09 | 0.15 |
| Example 7 | 0.12 | 48 | 20 | 100 | 4.8 | 0.25 | 0.15 |
| Example 8 | 0.13 | 40 | 15 | 70 | 0.9 | 0.30 | 0.16 |
| Example 9 | 0.10 | 40 | 15 | 70 | 5.5 | 0.11 | 0.07 |
| Example 10 | 0.11 | 43 | 20 | 65 | 6.5 | 0.10 | 0.85 |
| Comparative Example 1 | 0.20 | 41 | 20 | 70 | 6.8 | 0.50 | 0.15 |
| Comparative Example 2 | 1.00 | 40 | 20 | 70 | 5.0 | 0.50 | 0.15 |
| Comparative Example 3 | 0.18 | 60 | 30 | 105 | 5.5 | 0.45 | 0.18 |
| Comparative Example 4 | 0.25 | 20 | 8 | 55 | 5.2 | 0.43 | 0.17 |
| Comparative Example 5 | 0.20 | 41 | 20 | 70 | 6.8 | 0.50 | 0.17 |
| Comparative Example 6 | 1.00 | 40 | 20 | 70 | 5.0 | 0.50 | 0.15 |
| Comparative Example 7 | 0.18 | 60 | 30 | 105 | 5.5 | 0.45 | 0.16 |
| Comparative Example 8 | 0.25 | 20 | 8 | 55 | 5.2 | 0.43 | 0.15 |

According to the results indicated in Table 1, the relative standard deviation of the ratio of the number of atoms of tungsten to the number of atoms of metal components other than lithium contained in the coated lithium nickel composite oxide particles is small in the positive-electrode active materials obtained in Examples 1-10 where tungsten trioxides with $I_{WO2.90}/I_{WO3.00}$ less than or equal to 0.15 were used as materials.

That is, the results indicate that the coated lithium nickel composite oxide particles included in the positive-electrode active materials substantially uniformly contain or are coated with the compound of tungsten and lithium.

On the other hand, in Comparative Examples 1-8 where tungsten trioxides with $I_{WO2.90}/I_{WO3.00}$ greater than 0.15 were used as materials, the relative standard deviation of the ratio of the number of atoms of tungsten to the number of atoms of metal components other than lithium contained in the coated lithium nickel composite oxide particles in the obtained positive-electrode active materials is greater than 0.4.

That is, the percentage of the compound of tungsten and lithium varies among the coated lithium nickel composite oxide particles contained in each positive-electrode active material.

Tungsten trioxides according to the embodiment and the examples are described above. However, the present invention is not limited to the above-described embodiment and examples, and variations and modifications may be made without departing from the scope of the present invention described in the claims.

The present international application is based on and claims priority to Japanese Patent Application No. 2017-224024 filed on Nov. 21, 2017, the entire contents of which are hereby incorporated herein by reference.

The invention claimed is:

1. A tungsten trioxide composition comprising:
partially oxygen deficient $WO_{2.90}$ as an impurity, wherein $IWO_{2.90}/IWO_{3.00}$ of the tungsten trioxide is less than or equal to 0.15, the $IWO_{2.90}/IWO_{3.00}$ indicating a ratio of a peak intensity $IWO_{2.90}$ of a (200) plane of the $WO_{2.90}$ to a peak intensity $IWO_{3.00}$ of a (200) plane of the $WO_{3.00}$ in an XRD pattern,
wherein a 10% cumulative particle diameter is greater than or equal to 10 μm, a 50% cumulative particle diameter is greater than or equal to 30 μm and less than or equal to 55 μm, and a 90% cumulative particle diameter is less than or equal to 100 μm.

2. The tungsten trioxide as claimed in claim 1, wherein a specific surface area is greater than or equal to 0.5 m$^2$/g and less than or equal to 7.0 m$^2$/g.

* * * * *